United States Patent [19]

Miles et al.

[11] 3,716,892
[45] Feb. 20, 1973

[54] METHOD AND APPARATUS FOR PROCESSING POULTRY

[75] Inventors: Wayne G. Miles; Edward J. Crane, both of Ottumwa, Iowa

[73] Assignee: International Agri-Systems, Inc., Ottumwa, Iowa

[22] Filed: Oct. 19, 1970

[21] Appl. No.: 81,820

Related U.S. Application Data

[63] Continuation-in-part of Ser. No. 9,151, Feb. 6, 1970, abandoned.

[52] U.S. Cl. ..........................17/11, 17/11.1, 17/47, 17/51
[51] Int. Cl. .............................................A22c 21/02
[58] Field of Search............17/11.1, 11.2, 11, 14, 45, 17/47, 51

[56] References Cited

UNITED STATES PATENTS

| | | | |
|---|---|---|---|
| 3,074,103 | 1/1963 | Roth et al. | 17/47 |
| 3,561,040 | 2/1971 | Floden | 17/11.2 |
| 3,138,822 | 6/1964 | Amstad | 17/11.2 |
| 3,119,145 | 1/1964 | Weprin | 17/47 |
| 3,343,477 | 9/1967 | Ekstam | 17/14 UX |

FOREIGN PATENTS OR APPLICATIONS

274,695    9/1964    Netherlands

*Primary Examiner*—Lucie H. Laudenslager
*Attorney*—Price, Heneveld, Huizenga & Cooper

[57] ABSTRACT

A poultry processing apparatus and method wherein the poultry are continuously conveyed through an elongated enclosure. The environmental air within at least portions of the enclosure is kept at predetermined temperature and humidity conditions so as to effect scalding of the fowl within the enclosure without immersing them in a liquid bath. Means are provided within the enclosure for spraying the fowl with a liquid scalding solution and picking the feathers therefrom. The feathers are carried away by a liquid-filled trough in the bottom of the enclosure.

50 Claims, 15 Drawing Figures

METHOD AND APPARATUS FOR PROCESSING POULTRY

This application is a continuation-in-part of application Ser. No. 9,151 filed Feb. 6, 1970, now abandoned, assigned to a common assignee.

BACKGROUND OF THE INVENTION

This invention relates to a method and apparatus for processing poultry and, more particularly, to such a method and/or apparatus wherein the fowl to be processed are scalded and their feathers removed. These steps are accomplished, ordinarily, subsequent to killing and bleeding of the poultry which are suspended from a continuously traveling overhead conveyor.

In the removal of feathers from fowl it is necessary that the fowl be scalded as a means of "loosening" the feathers so that they can be removed effectively by mechanical picking means. Such scalding has been accomplished generally in the past by immersing the fowl in a liquid bath of scalding solution of the proper temperature and thereafter withdrawing them for subsequent processing steps. Immersion of the fowl in the liquid scalding bath results, as will be readily appreciated by those skilled in the art, in a number of serious problems. These problems, prompted primarily by the tendency of the scalding liquid to become "unsanitary," include the necessary replacement of solution, the ingestion of unsanitary liquid by the fowl being processed and the general cleanliness problem encountered without the scalding tank when the fowl are conveyed therefrom to subsequent processing equipment.

It is necessary in the utilization of systems of this type, additionally, to wait a prescribed period of time after the bird has been killed to insure contaminated liquid ingestion will be minimized. This delay, unfortunately, results in a "setting up" of the feathers making them more difficult to pick than if such picking could be begun more quickly following the killing of the bird.

It has been proposed heretofore in the art, as a means of obviating the disadvantages of bath scalding outlined above, to subject fowl to a steam environment in order to accomplish the scalding process. Examples of such prior proposals are illustrated in U.S. Pat. Nos. 2,972,167 and 3,074,103 issued Feb. 21, 1961 and Jan. 22, 1963, respectively. Each of these patents discloses an apparatus and/or method wherein the birds after being subjected initially to the impingement of water are conveyed through a vertical tunnel having steam jets around its periphery. The steam is ejected onto the birds while in the tunnel as a means of accomplishing the scalding function. The birds are thereafter conveyed into an integrally housed picking chamber where, ostensibly, the feathers are removed therefrom.

Devices of the type illustrated in the two patents noted have never met with wide acceptance in the art because of the difficulty encountered in attempting to maintain the scald time and temperature within prescribed conditions. Such is true particularly where a "soft scald" is desired since the temperature ranges must be kept ordinarily below 135°Fahrenheit in order to prevent cooking and subsequent shedding of the outer epidermal layer. The ejected steam, in the experience of the inventors, simply cannot be controlled with sufficient accuracy to cause the bird bodies to assume, but not exceed, the desired temperature in a high-humidity environment. These problems are magnified, as will be readily appreciated, by the fact that the temperature, size and the like of the incoming fowl may vary widely in a given installation.

Other prior art patents of which applicants are aware dealing with the general problem to which this invention is addressed are U.S. Pat. Nos. 2,813,298 issued Nov. 19, 1957; 2,977,628 issued Apr. 4, 1961; and 3,138,822 issued June 30, 1964.

OBJECTS OF THE INVENTION

It is an object of this invention, thus, to provide a method and/or apparatus which is not subject to the disadvantages outlined above.

It is an object of this invention, more particularly, to provide such a method and apparatus wherein the scalding temperature may be controlled with sufficient accuracy to permit both "soft" and "hard" scalding of the birds being processed as desired while retaining the sanitary advantages of the non-bath type of scalding procedure.

It is yet a further object of this invention to provide such a method and apparatus which also includes means for and the step of removing the feathers from the fowl while they are in the scalding enclosure, thus not only confining the removed feathers to a specified area but, additionally, permitting the fowl to be at least partially picked under optimum scalding conditions.

It is yet another object of this invention to provide such a method and apparatus which lends itself readily to incorporation into "on-the-line" poultry processing arrangement.

It is a further object of this invention to provide such a method and apparatus whereby the picking process can be begun as soon as practically possible following killing of the birds such that the feathers will be removed with optimum ease.

It is, thus, an over-all object of the invention to provide such a method and apparatus wherein picking of poultry can be accomplished in a condensed operation requiring minimized clean up, with an economy and effectiveness not achievable heretofore.

These objects are accomplished, briefly, by the provision of an apparatus for and method of treating fowl including a generally closed elongated enclosure having fowl entry and exit extremities wherethrough the fowl are conveyed by a relatively conventional over-head conveyor. Means are provided for controlling the environmental air within at least portions of the enclosure within a predetermined range of temperature and humidity conditions. The apparatus and method includes preferably, additionally, means for and the step of removing the feathers from the fowl within the enclosure by subjecting the fowl to the action of mechanical picking means.

DESCRIPTION OF THE DRAWINGS

The apparatus and method which is the subject of this invention will be readily understood by those skilled in the art by reference to the following specification and accompanying drawings in which:

FIG. 9b is a fragmentary, perspective view of a second segment suitable for use with the segment shown in FIG. 9a;

DESCRIPTION OF THE PREFERRED EMBODIMENT

Referring initially to FIGS. 1 through 8, an illustrative embodiment of this invention (excluding significant portions of the temperature control system and scalding sections) includes an elongated poultry processing enclosure 10 having upright legs or supports 11. Suspended between the supports 11 at the bottom of the enclosure is an elongated trough 12 having a bottom 13 and side walls 14. Water or other suitable fluid is circulated through the trough during utilization of the apparatus in the direction indicated by the arrows 15. The water flowing within the trough 12 entrains the feathers and other debris which is removed from or comes off of the fowl during processing within the enclosure 10.

The feathers and debris are carried by the flow of the water to a feather remover 17 (FIG. 1a) which removes them in conventional fashion via an endless belt-like structure having upstanding fingers thereon. This mechanism, of course, may be placed at any suitable location within the plant. The feather remover illustrated is driven by a suitable driving mechanism 25. The lower extremity of the belt rotates in the water, the feathers and debris are picked up by the fingers and conveyed to a discharge point 26. The water within the trough is recirculated and heated if desirable by means of a conventional pump and heating apparatus.

Figure 1A:
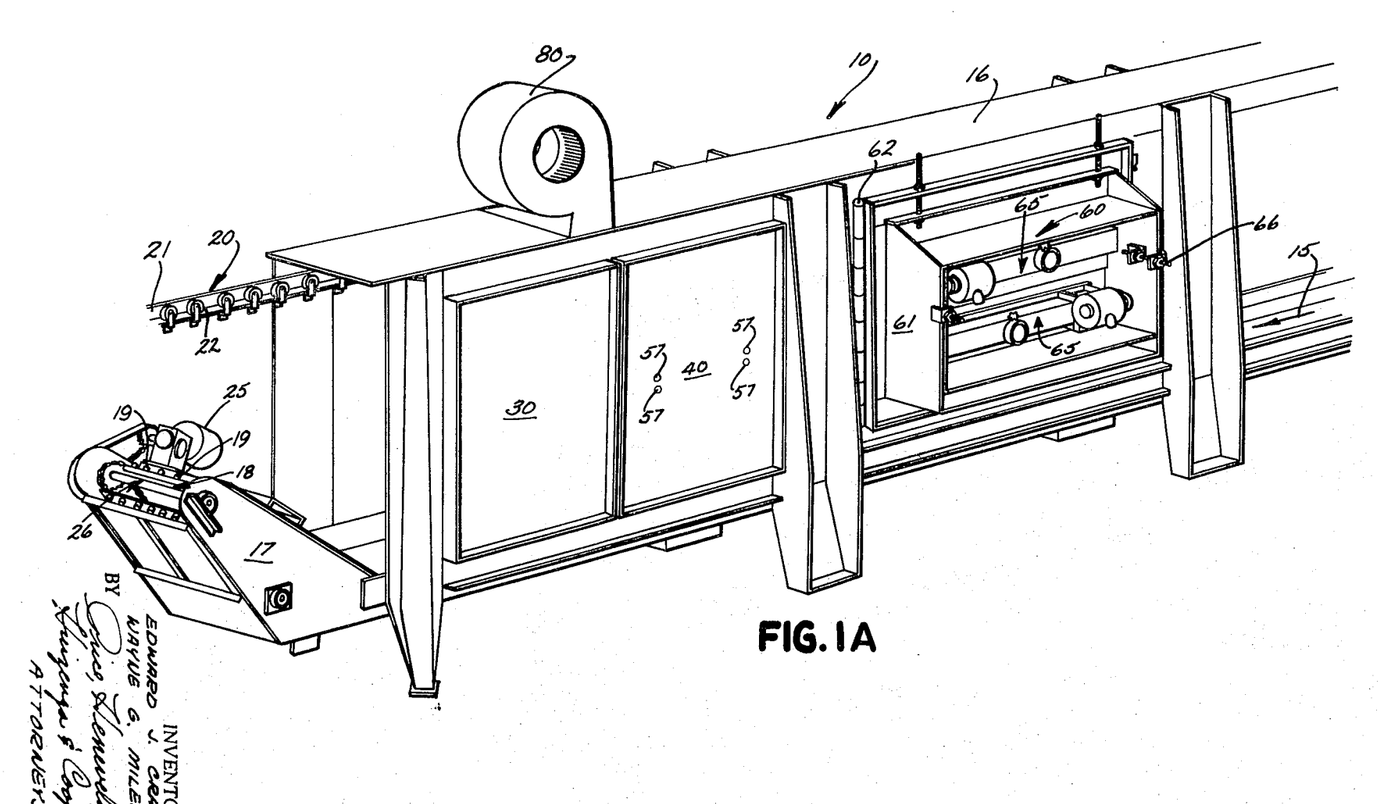
FIG. 1a is a fragmentary, perspective view illustrating the first segment of a processing enclosure constructed in accordance with the teachings of this invention but omitting the air circulation and conditioning system for purposes of simplicity.

The upper side of the enclosure 10 has an elongated top 16 suitably secured thereto. Beneath top 16 supported in suitable fashion is the overhead conveyor assembly 20 which comprises an inverted T-shaped track 21 having conventional roller assemblies 22 mounted thereon. From the roller assembly 22 the shackles 23 are supported, the apparatus being propelled by a conventional drive chain (not shown). The conveyor assembly 20, preferably, is designed so as to be compatible with the existing conveyor assembly in the particular plant in which the apparatus is to be installed such that it may be hooked directly into the line as it exits from the killing and bleeding area.

Figure 9A:
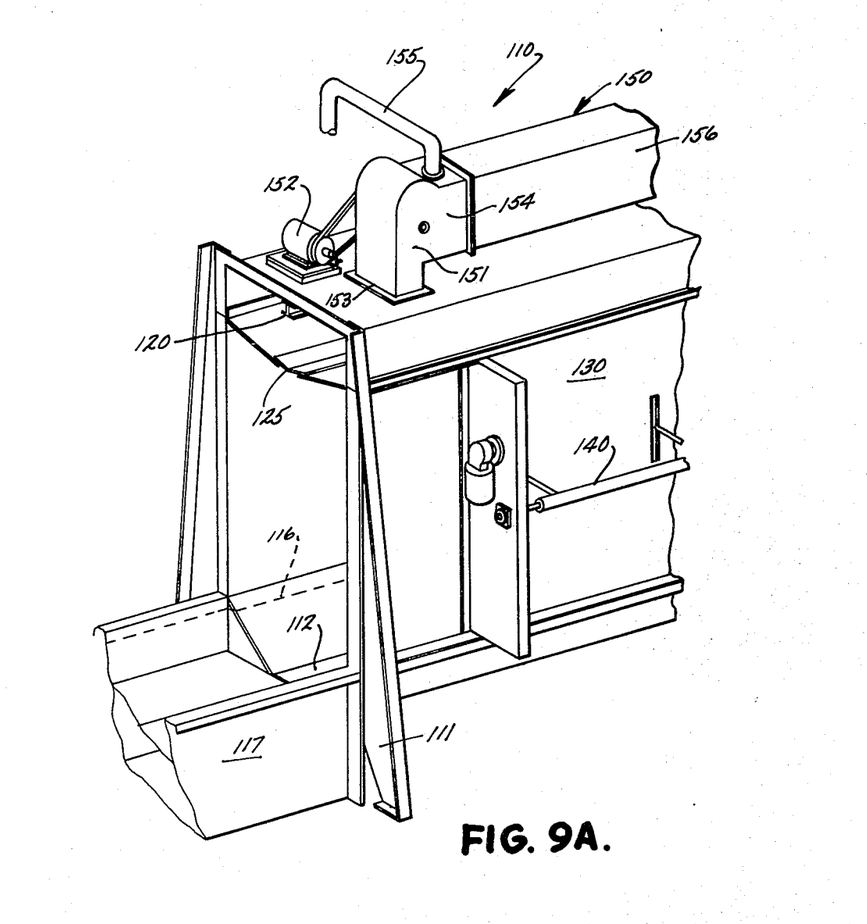
FIG. 9a is a fragmentary, perspective view of a first section of a picking enclosure constructed generally along the lines shown in FIG. 1 but illustrating, additionally, the air recirculation assembly and preferred double wall construction.

The sides of the apparatus illustrated in FIG. 1 are enclosed by sidewall members 30 which, preferably, take the form of the double-walled structure described hereinafter in connection with FIG. 9. At prescribed locations along the sides of the apparatus, there are positioned pickers, the spraying assembly of the like to be discussed hereinafter, the double sidewall construction being omitted at these locations. For present purposes, it will suffice to state that every attempt is made to keep the enclosure as air tight as reasonably possible consonant with ingress and egress demands eliminating, insofar as possible, leakage of the heated, moistened air therewithin to the ambient room atmosphere and vice versa.

Figure 6:
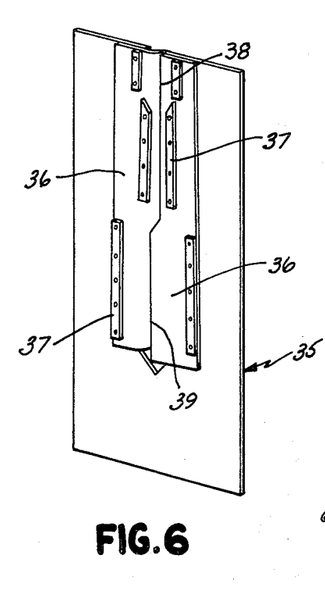
FIG. 6 is a perspective view of an end panel enclosure suitable for use in the apparatus of FIG. 1.

To this end there may be provided, additionally, end walls 35 (see FIG. 6) at the ingoing and emerging extremities of the enclosure. One such wall is positioned, preferably, adjacent the feather remover 17 and the other at the right hand extremity of the apparatus in FIG. 1b. The end walls 35 each comprise a plate 35 of suitable dimension to enclose the area between the trough 12, the sidewalls 30 and the top 16 of the apparatus. Each is provided with a pair of curtains 36 of flexible material such as rubber of the like secured as at 37 to the plate. The resultant configuration forms a chain or shackle passage 38 and a bird passage 39. As the birds, thus, are conveyed against the flexible curtains, these curtains flex or deform to permit passage of the bird into or out of the enclosure. They thereafter return to their original configuration as illustrated in FIG. 6 in order to maintain insofar as practical the seal between the interior of the enclosure and the exterior air.

Figure 4:
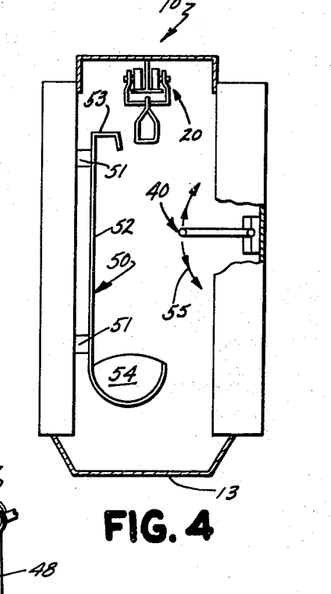
FIG. 4 is a cross-sectional view through the enclosure of FIG. 1 at the spraying assembly.
Figure 5:
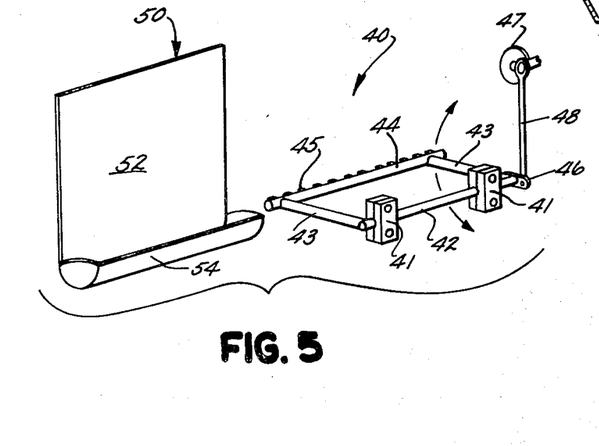
FIG. 5 is a fragmentary, schematic illustration of the spraying assembly.

Referring now specifically to FIGS. 4 and 5, the birds, upon entry into the enclosure, are subjected initially to the impingement of the series of oscillating jets of water. The spray assembly includes a pair of bearing blocks 41 suitably mounted to the framework or sidewalls of the apparatus. Journaled within the blocks 41 is a shaft 42 from which extend the manifold support arms 43. A spray manifold extends between the interior extremities of the support arms and this manifold has a series of jet-like nozzles 45 thereon as indicated in FIG. 5.

The manifold 44 is caused to oscillate or pendulate in the approximate arc illustrated by the reference numeral 55 in FIG. 4 by means of a crank 46 connected to an eccentric 47 through a connecting rod 38. The eccentric 47 is powered in conventional fashion by an electric motor or the like and the motor transmitted to the manifold as will be readily appreciated by those skilled in the art. The drive motor, of course, is mounted on the exterior of the enclosure to prevent undue damage to it from water being sprayed.

This invention contemplates, as will be pointed out in detail hereinafter, the impingement of liquid scalding solution such as water upon the birds from the oscillating or pendulating manifold 44 having a temperature in the range of about 120°Fahrenheit to 160°Fahrenheit. The particular temperature will depend, of course, upon the length of the time the birds are in the enclosure, the type of birds being processed, their temperature upon entry and the like. This fluid, preferably, is pressurized in the range of 75 to 400 p.s.i. and heated to the desired temperature by means such as team injection exterior of the enclosure. It may be transmitted into the spray manifold 44 by any conventional means such as flexible rubber tubes connected to and communicating with the manifold via the support arms 43 or shaft 42.

Positioned on the opposite side of the enclosure from the spray assembly 40 is the baffle assembly 50. This assembly comprises a pair of supports 51 carrying a baffle which may be either planer or corrugated in zig-zag fashion. The upper extremity of the baffle includes, as illustrated in FIG. 4, a deflector 53 and the lower extremity includes a trough-like structure 54.

The baffle assembly 50 functions to redirect the spray emitted from the nozzle or spray assembly 40 which does not strike a bird back against the left-hand side of the bird as viewed in FIG. 4. To this end, it is sometimes helpful if a corrugated baffle structure having folds running horizontally is utilized such that the deflection will be at varying angles against the side of the bird. This will occur to some extent, of course, even when a flat baffle such as that shown at 52 is utilized.

The impinging of the scalding solution upon the birds at the pressures noted functions to separate and wet the feathers as well as to begin the loosening process. The oscillating nature of the impinging liquid stream and the pressure at which it issues from the nozzle, of course, enhances this phenomenon, making it possible to rough-pick the birds after a short period in the extended length of the scalding enclosure.

Figure 3:
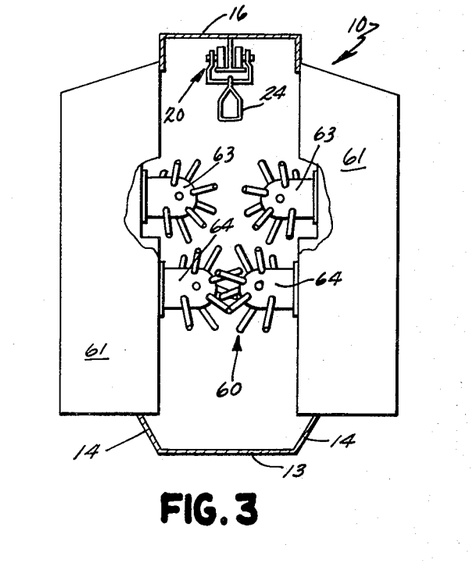
FIG. 3 is a cross-sectional view through the enclosure of FIG. 1 at the first picking assembly.
Figure 7:
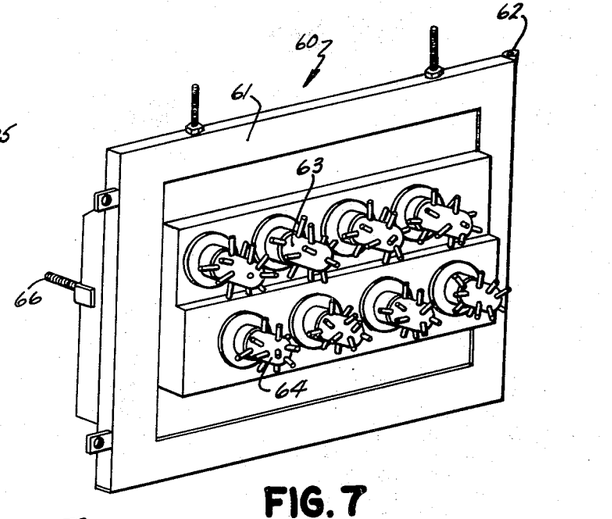
FIG. 7 is a perspective view of the door-like structure which carries one side of the first picking assembly.

Positioned downstream from the spraying assembly 40 and preferably spaced by 8 to 16 feet of scalding enclosure as will be described hereinafter regarding the structure shown in FIG. 9, is the rough or first picking assembly 60. Picking assembly 60 comprises two or more door-like structures hingedly mounted as at 62 on either side of the apparatus. Each of the doors carries one side of the picking assembly which, in the embodiment illustrated, comprises an upper row of bullet-shaped pickers 63 and a lower row of bullet-shaped pickers 64. Each of the bullet-shaped pickers or supports has affixed thereto in a manner readily appreciated by those skilled in the art a series of flexible picking or wiping fingers which function to contact the bird and remove the feathers therefrom. The physical arrangement of the supports 63 and 64 and the directions of rotation, preferably, are in accordance with the teachings of U.S. Pat. application Ser. No. 631,989 in the name of Edward Crane filed Apr. 19, 1967. Reference is made to this disclosure for the specific teachings of the picking assembly 60. Such reference is appropriate, particularly, since the nature of the rough picking device or devices utilized is not particularly important to the concepts of this invention and other devices may be utilized, undoubtedly, with satisfactory results depending upon the particular situations encountered.

The gear boxes for the picking assembly 60 along with the drive motors are mounted, preferably, on the door exteriors as indicated at 65 in FIG. 1a. These gear boxes, fabricated preferably in accordance with the teachings of U.S. Pat. application Ser. No. 820,826 in the name of Edward J. Crane filed May 1, 1969, function to rotate the picking supports in a manner which will be readily appreciated by those skilled in the art.

There is, of course, a door 61 mounted on each side of the machine. When it is desirably or necessary to service the picking structures by replacing fingers, etc., or to clean the interior of the machine, the doors, held shut in operation by means of latch 66, may be swung to an open position to permit ready access to the machine interior. Gasketing should be provided around the door to prevent unnecessary leakage of the scalding air on the interior of the cabinet to the ambient atmosphere during operation.

Figures 1B, 2:
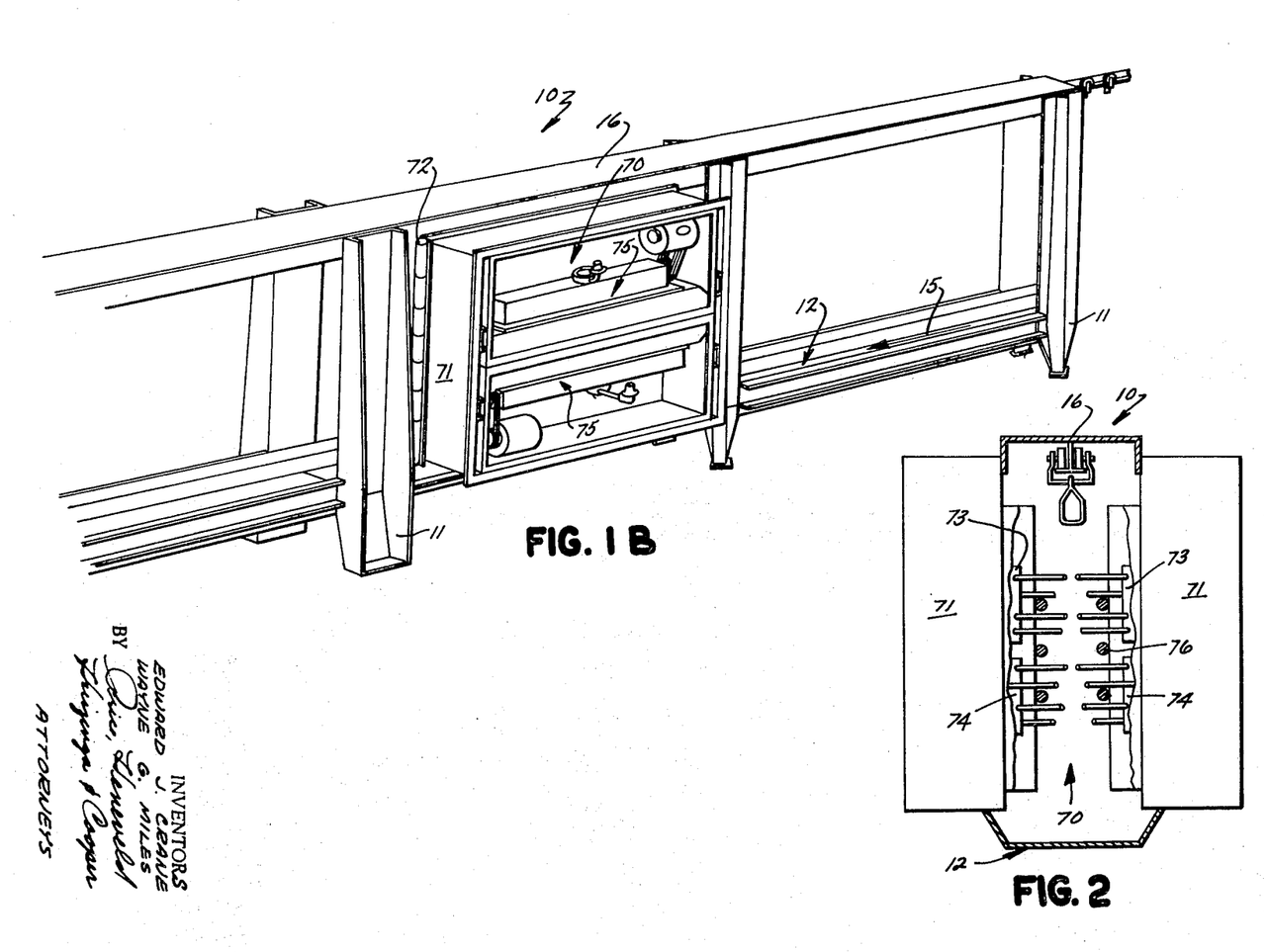
FIG. 1b is a fragmentary, perspective view of the other segment of the apparatus shown in FIG. 1a with the side panels omitted for purposes of clarity.
FIG. 2 is a cross-sectional view through the enclosure of FIG. 1 at the second picking assembly.
Figure 8:
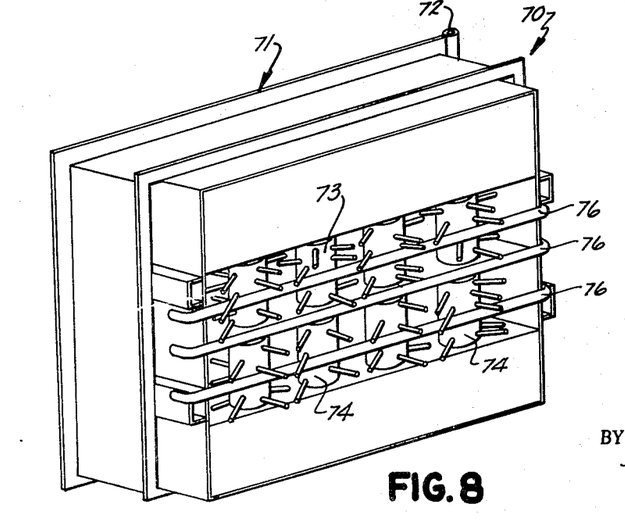
FIG. 8 is a perspective view of the door-like structure which carries one side of the second picking assembly.

Positioned downstream from the first or rough picking assembly 60 is a second picking assembly or assemblies 70. This assembly or assemblies, as will be noted in detail hereinafter, are separated preferably from the rough pickers by one or more humidity scalding sections not illustrated in detail in this figure. Assembly 70, as illustrated in FIGS. 2 and 8 also comprises door-like structures 71 hingedly mounted at 72 on either side of the enclosure. The picker shown, again for illustrative purposes only, comprises a series of upper drum-shaped supports 73 and lower drum-shaped supports 74. Each of the supports on both sides of the apparatus rotates about vertical axes and has flexible picking fingers extending radially therefrom in the manner illustrated. As a means of achieving maximum picking efficiency, each upper support is rotated, preferably, in a direction opposite from the support immediately below it. Each support, additionally, is operated in the opposite direction from the support located directly across the path of bird travel from it. Such rotation can be accomplished, for example, by utilization of the drive mechanisms 75 illustrated mounted to the exterior of the doors 71. Abutment of the birds with the support drums is prevented in the embodiment illustrated in FIG. 2 by means of a series of elongated, circular guards 76 in the fashion shown generally in U.S. Pat. No. 3,453,685 to Masters issued July 8, 1969.

In certain situations it may be desirable to eliminate or supplement the end plates 35 illustrated in FIG. 6 by utilizing an air curtain at the entry and/or exit ends of the apparatus to seal the ingoing and/or exit extremities of the enclosure. Such a structure is illustrated in FIG. 1a and comprises, generally, a centrifugal blower 80 arranged, as will be readily appreciated by those skilled in the art, to emit a curtain of air across the entry extremity of the apparatus. As the birds are conveyed through the curtain it is deflected around their bodies, returning to its sealing configuration once passage is completed.

In other situations, it may be possible to eliminate end closures per se entirely. It has been found, for example, that where the humidity scalding sections are positioned fairly remotely from the extremities of the assembled apparatus, and where there are water sprays or the like at the extremities of the humidity and temperature controlled sections of the device, the closures may be eliminated with little problem. In this latter case, of course, the water sprays act as a barrier to convection currents which might otherwise carry the conditioned air out of the apparatus.

Referring now to FIGS. 9a, 9b, 9c and 11 there is illustrated an apparatus constructed generally in accordance with the teachings set forth in the previous discussion. In the structure of these figures, however, there is illustrated an air circulation and control assembly suitable for maintaining the environmental air within at least portions of the cabinet or enclosure at the prescribed conditions as well as an enclosure wall configuration specifically adapted for insulation and control purposes.

Referring to these figures, in which like or similar parts have been given reference numerals prefaced by a "1" corresponding to those portions previously described, the elongated enclosure 110 includes a series of upright legs or supports 111. Positioned between the supports at the lower portion of the enclosure is an elongated trough 112 within which the water or other solution to carry away the feathers and debris flows in the direction indicated by the arrows 115. A feather conveyor 117, ordinarily, will be provided at the left extremity of the apparatus illustrated in FIG. 9a.

The enclosure includes an overhead conveyor system or assembly 120 having suspended therefrom a series of conventional shackles 123 interconnected by drive chain 124. The shackles hang through a flexible seal 125 comprising two elongated strips of flexible material such as rubber, plastic or the like tending to retard rising of the conditioned air within the inner chamber into the upper section of the enclosure.

Figure 9B:
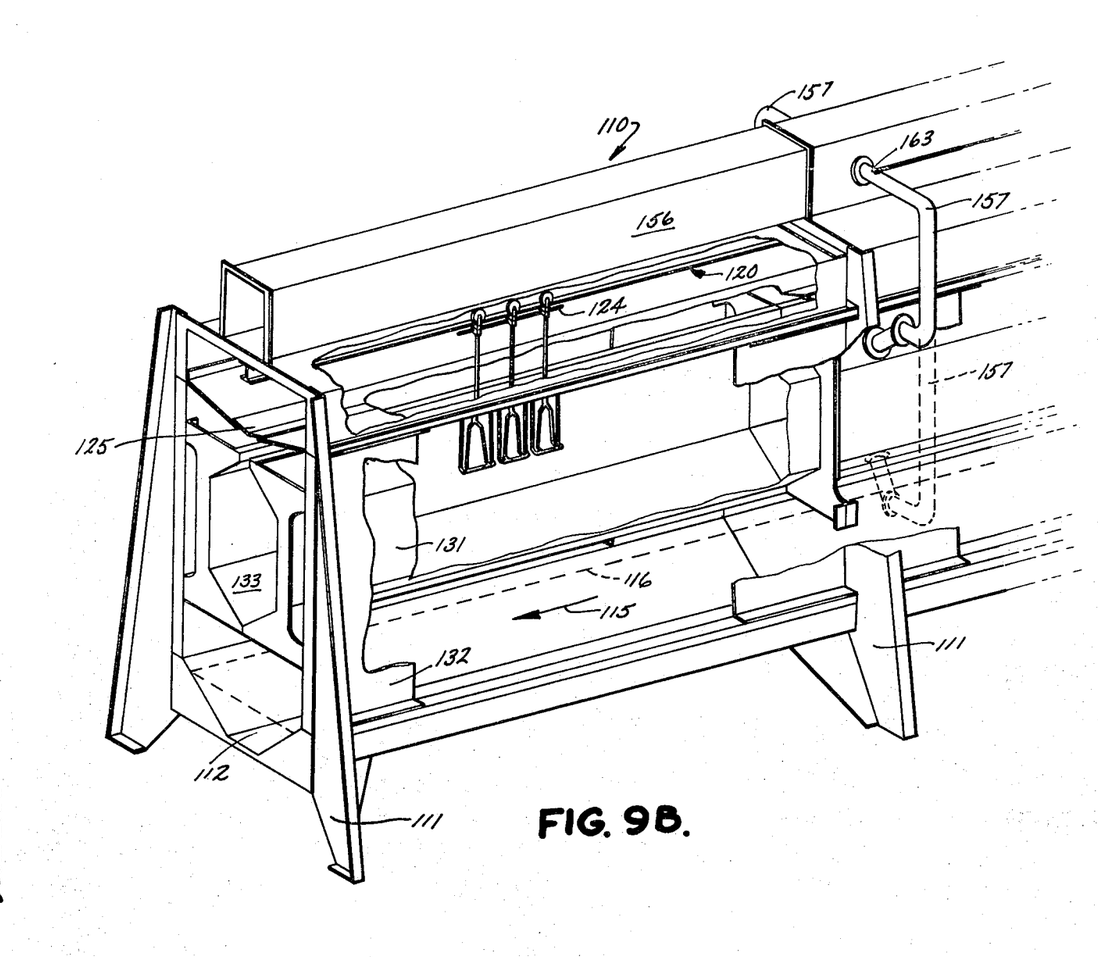
Figure 9C:
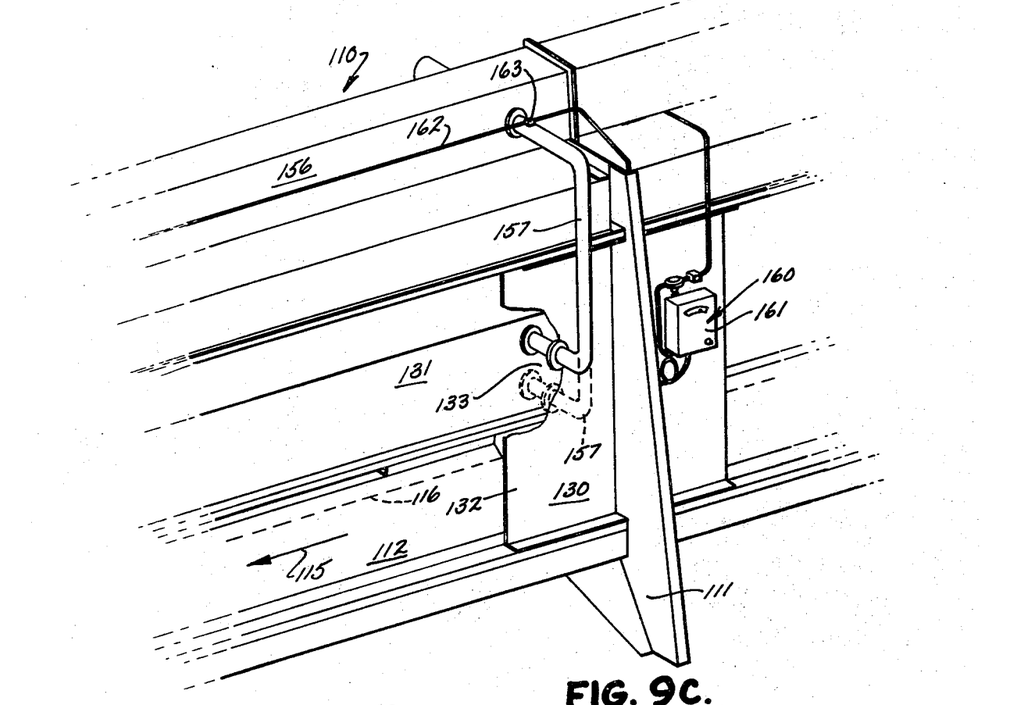
FIG. 9c is a fragmentary, perspective view of a third section suitable for use with the section shown in FIGS. 9a and 9b, it being contemplated that subsequent sections including picking means as will be hereinafter described will preferably be added in the actual practice of the preferred embodiment of this invention.

This invention contemplates the provision of intermediate humidity scalding sections between the spraying section 140 and/or the picking section through which the bird will be conveyed in suspended fashion and subjected to scalding by the environmental air within the enclosure between feather removing steps. Two such sections are illustrated in FIGS. 9b and 9c and include inner side walls 131a and 131b, outer side walls 132a and 132b, an inner V-shaped bottom 133 and an outer bottom which, of course, forms the trough 112. The upper boundaries of the inner chamber are formed by two upwardly converging sheets 136a and 136b, the sheets terminating prior to abutment to provide the shackle slot to which the seals 125 are attached. The inner chamber is maintained in position within the outer enclosure by means of longitudinally spaced ribs 137, the ribs being apertured at 138 to permit air to flow between the inner and outer housings. The inner chamber, preferably, is shaped somewhat larger than the birds to be processed but sufficiently small that the temperature and humidity conditions therein can be accurately controlled as will be set forth hereinafter.

There is provided, thus, an air space between the inner portions of the enclosure and the exterior portions of the enclosure through which air is circulated as an insulation medium in a manner to be described hereinafter. The inner cabinet, of course, is discontinued in the picking section and spraying section so that the feathers and water may fall freely into the trough 112 to be conveyed out of the apparatus in the manner described heretofore.

Near the entry end of the apparatus there is provided a spray assembly 140 identical to that discussed previously. The baffle assembly, if desirable, may be mounted on a door similar to that shown at 61 or 71 in FIG. 1 to permit access for cleaning and/or service purposes. The fowl, thus, are initially subjected to the impinging jets of heated scalding fluid as they enter into the processing enclosure. Means may be provided, if necessary, for sealing the extremities such as those described previously.

The environmental air circulation and conditioning system 150 includes a centrifugal squirrel-cage compressor 151 driven by a variable speed drive mechanism 152. The intake 153 of compressor 151 communicates with the interior of the enclosure. The air withdrawn is compressed and routed into a mixing chamber 154 having a live steam input 155 thereinto. The heated, humidified air is thereafter pushed along an elongated transport duct 156 and discharged at various suitable, spaced locations and angles along the length of the apparatus via discharge ducts 157. The discharge ducts, as illustrated, extend through the interior sidewalls 131 into the interior of the apparatus through which the birds are conveyed.

The heated, conditioned air is preferably baffled or diffused at the inlet to the interior chamber such that it will not impinge directly upon the birds being processed. It has been found, for example, that merely a circular plate 158 (FIG. 11) affixed to but spaced from the conduit outlet 157 by means of spacer-retainers 159 will suffice for these purposes. Air entering the inner chamber through sidewall 131a is baffled, thus, so that it exits in a direction parallel to sidewall 131a, the conditioned air thereafter flowing throughout the inner chamber and around the birds being processed.

This invention contemplates, as noted previously, the provision of an air conditioning system wherein the temperature and humidity of the air to which the birds are subjected during their travel through at least portions of the enclosure will be kept within prescribed limits. There is provided, thus, a control system 160 (see also FIG. 10) having a logic unit. The desired temperature setting is fed into the logic unit via a thermostat control 161. Other inputs to the logic system may comprise the spray fluid temperature, the enclosure temperature, the discharge duct temperatures and, if necessary, the feather-conveying liquid temperatures. All of these inputs, of course, may not be necessary in a given situation and, often, satisfactory results can be achieved merely by using the temperature in the discharge ducts 157 or overhead duct 156 as a reference. These temperatures can be detected, as shown in FIG. 9c, by means of conventional sensors 163 connected to the control 160 by leads 162.

Figure 10:
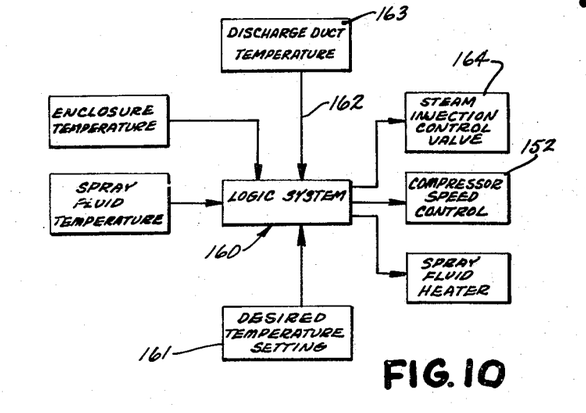
FIG. 10 is a schematic, block diagram of a control system suitable for utilization in conjunction with this invention.

The logic system 160, as illustrated in FIG. 10, controls the steam injection control valve, the compressor speed control and the spray fluid heater. Again, in most circumstances, satisfactory results can be obtained by controlling only the steam injection control valve located in conduit 155, adjustments in the other system parameters being made manually as required.

OPERATION

Figure 12:
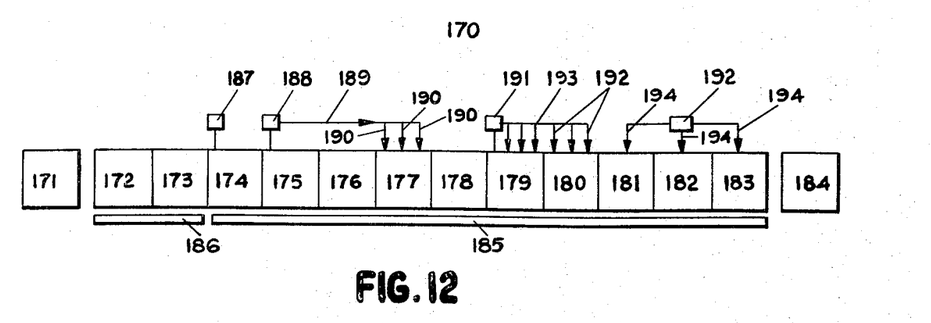
FIG. 12 is a schematic representation of a typical processing line constructed in modular fashion in accordance with the teachings of this invention.

The operation of a system constructed in accordance with the teachings of this invention is illustrated best by examining the "typical" system illustrated schematically in FIG. 12. This system, which has proved itself satisfactory for the scalding and picking of fowl under so-called "hard scald" conditions includes the killing area 171 at one extremity of the apparatus and a hock cutting area 184 at the other extremity of the apparatus. The overhead conveyor, of course, runs continuously between the killing and hock cutting area, the picked birds passing into the eviscerating area in conventional fashion once the hocks have been severed therefrom.

The device illustrated in FIG. 12 is shown as constructed from modular sections which may be in the neighborhood of 8 feet in length and designed, preferably, so as to interfit with one another in any desired pattern depending upon the particular type of poultry to be processed. The device includes two blood tunnels 172 and 173 into which the poultry pass immediately after being killed for bleeding purposes. These tunnels, while not forming a major concept of the instant invention, may be conveniently fabricated in modular form with the remainder of the system and will be effective, when utilized, to limit the blood spatter, etc. within the processing plant. They will consist, ordinarily, of merely hollow exterior shells having a drain trough 186 or the like positioned therebeneath to catch the blood.

From the blood tunnel 173 the birds pass into a spraying cabinet 174 constructed preferably in accordance with the device illustrated in FIGS. 4 and 5. As the poultry pass out of the spray cabinet 174 they enter a series of two rough pickers 175 and 176. These pickers, for example, may be of the type illustrated previously in this specification in connection with a description of FIGS. 2, 3, 7 and 8 or, of course, may take any other convenient form, the picking units being mounted preferably in door-like structures for purposes of access, cleaning and maintenance.

Figure 11:
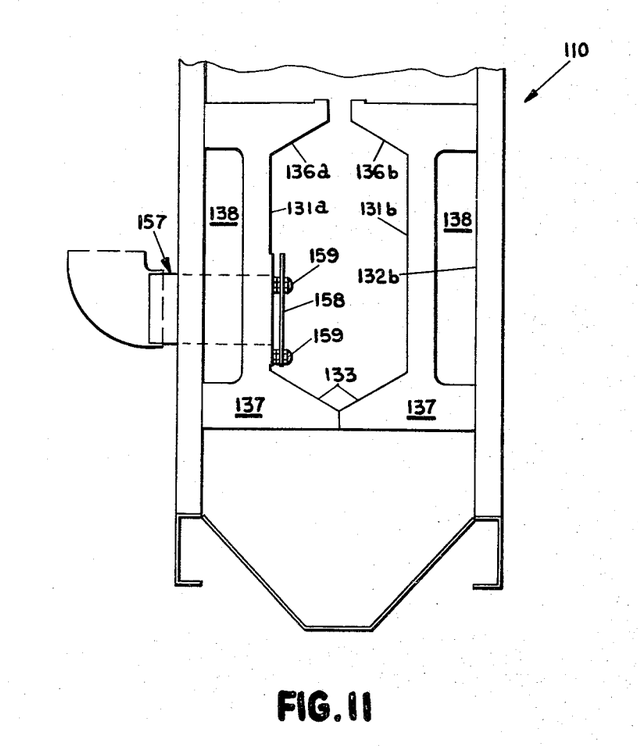
FIG. 11 is a cross-sectional view of the apparatus illustrated in FIGS. 9a, 9b and 9c.

From the pickers 175 and 176 the birds pass into a humidity scalding cabinet 177 of the type illustrated generally in FIGS. 9b and 11 where the partially picked birds are subjected to the humidity scalding environment. At this stage in the procedure, of course, many of the feathers have been removed and the humid, warmed air can come directly into contact with the birds' skin. After passing through the humidity cabinet 177, the birds enter a hock picker 178 to experience further picking. Subsequent to emergence from the hock picker, the birds may pass through two more humidity cabinets 179 and 180 identical to cabinet 177 and thereafter pass through a series of finishing pickers 181, 182 and 183. As the birds emerge from cabinet 183, the overhead conveyor system comes into operative engagement with a hock cutter of any conventional type and the birds are severed from the conveyor for transportation into the eviscerating section of the plant.

Positioned within enclosure sections 174 through 183 is the trough 185 corresponding to the trough 112 illustrated in FIG. 9b. This trough, as noted previously, functions to receive the feathers, water and other debris falling from the birds as they pass through the system and transport the same to a suitable removal location. The water in trough 185 may be recirculated since it does not contact the birds.

As the birds emerge from blood tunnel 173 and enter the spray tunnel 174, they are subjected to the impingement of the liquid scalding solution from source 187. The wet birds then go into the first rough picker 175, the environment within units 175, 176 and 177 being controlled by the fan-mixer 188 corresponding generally to units 151 through 155 shown in FIG. 9a. The conditioned air from unit 188 is routed via overhead conduit or duct 189 to the discharge conduits 190 into the inner shell of humidity cabinet 177 in precisely the same manner as illustrated in FIG. 11. This air is drawn back by the intake of unit 188 through the pickers 175 and 176 and, thus, the humidity and temperature within pickers 175 and 176 is maintained at approximately the same conditions as is the case within the inner shell of humidity cabinet 177. It should be noted, in this regard, that the intake from unit 188 draws air from both open extremities of the inner chamber within humidity cabinet 177 as well as through the shackle access slot along the top thereof. This complete circulation of air along the sides of the inner cabinet assist in an insulating sense in maintaining the desired temperature and humidity conditions within the inner chambers bounded by the walls 131, 133 and 136 (see FIG. 11).

The contacting of the wet birds by the rough pickers 175 and 176, in addition to removing many of the feathers, functions to press the heated water from the spray section 174 against the skin of the birds as well as the droplets of highly humidified fluid which are present from the recirculation system 180. The pressing of these heated fluids and air into contact with the skin of the birds, of course, hastens the scalding process since feathers are loosened only by the heating of the skin to which they are attached.

As the birds emerge from the hock picker 178, they pass through a series of two more humidity cabinets 179 and 180 serviced by a separate fan-conditioner unit 191 supplying conditioned air to the interior cabinets in the same manner as illustrated in FIG. 11 through discharge conduits 192 and overhead duct 193. Once the birds emerge from humidity cabinets 179 and 180, they are ready for finished picking and, ordinarily, cold water may be utilized in the finishing picking units. A source of such water is illustrated at 192 feeding to the three finishing pickers via conduits 194. The spray of cold water across the enclosure at the entrance to cabinet 181 and the spray of heated water across the entrance to spraying chamber 174 has been found to provide sufficient isolation along the scalding portions of the enclosure without the provision of separate air curtains or closures such as are illustrated in FIGS. 1 and 6.

Where it is desired to obtain a "soft scald" on the birds, the temperature of the liquid scalding medium issuing from the nozzle assembly 140 is controlled within the range of about 126° to 135°Fahrenheit, best results having been attained when the temperature is 128° to 129°Fahrenheit depending, of course, on the length of time in which the birds are kept in the enclosure. The desired temperature setting 161 of the cabinet interior is also adjusted to the temperature of the scalding medium, in this case, about 128° to 129°Fahrenheit. The logic system then causes, by actuation and deactuation of the steam injection control valves 164, the temperature of the incoming air into the enclosure to equal approximately that of the scalding fluid issuing from nozzle assembly 140.

The use of live steam at a point exterior of the processing enclosure permits, of course, the air to be heated to the desired temperature and humidified to approximately 100 percent relative without subjecting the birds directly to the high temperature steam. The baffle plates 158, of course, assist in preventing direct impingement of locally "over-heated" air onto the birds as well. This prevents cooking or localized burning of the birds and, additionally, permits a successful "soft scald" since the temperatures to which the birds are subjected will remain relatively constant within the desired range.

In the device illustrated in FIGS. 9a through 9c, the intake of one of the circulation fans is positioned within the spraying cabinet such that the circulating conditioned air also passes through the spraying cabinet. Depending upon the conditions of the ambient atmosphere surrounding the unit, such a construction may prove very valuable in certain situations since it assures that the scalding medium will not cool appreciably prior to impinging on the birds. It will be unnecessary, thus, to overheat the scalding medium to allow for cooling and, thus, the system may be much more effectively controlled than those of the prior art utilizing live steam within the picking and processing enclosure directly.

During operation of the apparatus, air is constantly withdrawn from the cabinets, conditioned by the injection of live steam in the mixing chambers in response to the then existing temperature at sensors 163 and thereafter reintroduced into the interior portions of the humidity cabinets as illustrated in FIG. 11. The utilization of live steam as the heating agent, of course, permits the simultaneous introduction of heat and humidity into the air. Similar results can be accomplished, however, by means of a conventional gas heater and a water spray system. In any event, the temperature within the various scalding sections of the cabinet will be kept at or very near the desired operating temperature and the humidity near the 100 percent relative mark.

In the event it is desired to "hard scald" the fowl being processed, the temperature setting at 161 is raised to about 135° to 145° depending, again, on the length of time the birds are kept in the scalding portions of the enclosure and their condition upon entry. A similar or perhaps greater increase is made in the temperature of the scalding fluid issuing from the spraying unit. Increasing the desired temperature settings will result, of course, in the introduction of increased quantities of steam into the air being recirculated to hold the temperature in the discharge pipes and, thus, the interior portions of the humidity cabinets and pickers at or near the desired setting. The system eventually will stabilize and processing can be initiated in the "hard scald" mode.

In normal operation, the birds should be kept in the scalding environment for a period in the neighborhood of 30 to 70 seconds, 45 to 60 seconds being preferable. Depending upon the length of the scalding portions of the enclosure, it may be necessary and/or desirable to provide two or more recirculation systems 110 as illustrated schematically in FIG. 12 at various locations. It may be desirable in some situations, additionally, also as illustrated in FIG. 12, to limit the extent of the scalding environment to specified portions of the enclosure, finish picking in a cold water bath or the like during certain phases of the operation. Such variations may be accomplished easily where the general exterior configurations of the various cabinet modules are maintained such that they may be cascaded in abutting, tunnel-forming relationship to one another.

Assuming the unit illustrated in FIG. 12 to be constructed from 8-foot modules, it will have an over-all length of approximately 96 feet. This length may be accommodated in relatively small plant areas, where necessary, by forming the enclosure in U-shape, a closed path or the like. The picking and scalding operation, thus, may be condensed and enclosed affording sanitation advantages not achievable heretofore with prior art devices. The birds, of course, are never contacted by recirculated water or fluid of any type and, because of the effectiveness of the picking-humidity scalding scheme of operation, water usage may be minimized. The system provides, in short, an economic, efficient and sanitary mode of scalding and picking heretofore known in the art.

While a preferred embodiment and minor modifications of the invention have been described in detail, it will be readily apparent to those skilled in the art that other embodiments may be conceived and fabricated without departing from the spirit and scope of this invention. Such embodiments are to be deemed as included within the scope of the following claims unless these claims, by their language, expressly state otherwise.

The embodiments of the invention in which an exclusive property or privilege is claimed are defined as follows.

1. Apparatus for treating birds comprising:
   a generally closed elongated enclosure having bird entry and exit extremities;
   conveyor means running through said enclosure for conveying birds to be treated therethrough along a predetermined path;
   spraying means within said enclosure adjacent said path for spraying said birds with a liquid scalding solution as they are conveyed thereby;
   picking means within said enclosure adjacent said path downstream from said spraying means for contacting said birds as they are conveyed thereby and wiping the feathers therefrom; and
   means for controlling the environmental air within at least portions of said enclosure within a predetermined range of temperature and humidity conditions to effect scalding of the birds, said controlling means including means for sensing when said environmental air is tending to depart from said conditions and means for introducing air which is within said predetermined range of temperature and humidity conditions into said enclosure to correct such tendency toward departure.

2. The apparatus as set forth in claim 1 wherein the temperature of said liquid scalding medium equals approximately the temperature maintained within said enclosure by said controlling means.

3. The apparatus as set forth in claim 2 wherein the temperature of said liquid scalding medium is in the range of 120° Fahrenheit to 160° Fahrenheit.

4. The apparatus as set forth in claim 3 wherein the humidity within said enclosure is maintained by said controlling means at 90 percent to 100 percent relative.

5. The apparatus as set forth in claim 4 which includes at least two of said picking means longitudinally spaced from each other within said enclosure, at least certain of said portions of said enclosure being positioned between said two picking means.

6. The apparatus as set forth in claim 1 which further comprises sealing means at at least one extremity of said enclosure in said path for sealing the interior of said enclosure from the outside atmosphere.

7. The apparatus as set forth in claim 1 wherein said enclosure includes at least one door-like cover swingably mounted along the side thereof, said picking means being mounted within said cover whereby it can be swung to an open, accessible position for cleaning and service.

8. The apparatus as set forth in claim 1 wherein said enclosure includes a series of door-like sections swingably mounted along the sides thereof, said sections being swingable from a closed to an open position to permit access to the interior of said enclosure for cleaning and servicing.

9. The apparatus as set forth in claim 1 wherein at least portions of said enclosure comprise a double-walled structure, an air space being provided between the walls for insulation purposes.

10. The apparatus as set forth in claim 9 which further comprises means for periodically replacing the air within said space with heated air.

11. The apparatus as set forth in claim 1 which further comprises trough means positioned within and extending generally for the length of said enclosure; means for circulating fluid through said trough means to carry away the feathers wiped from said birds by said picking means; and means for removing the feathers from said fluid.

12. The apparatus as set forth in claim 11 which further comprises means for heating said fluid.

13. The apparatus as set forth in claim 1 wherein said spraying means comprises a manifold mounted within said enclosure having a series of nozzles mounted thereon such that the scalding solution issuing therefrom will impinge upon the birds as they are conveyed thereby, and means for moving said manifold in an oscillating manner such that the solution issuing from said nozzles will sweep back and forth over the bodies of said birds.

14. The apparatus as set forth in claim 13 wherein said spraying means includes means for pressurizing said scalding solution to a pressure in excess of 75 psi in said manifold.

15. The apparatus as set forth in claim 1 wherein said picking means are spaced from said spraying means within said enclosure such that birds will be subjected to said environmental air within said enclosure for a period of time prior to being contacted by said picking means.

16. The apparatus as set forth in claim 1 wherein said controlling means includes means for preventing temperature increases above the approximate desired level.

17. The apparatus as set forth in claim 1 wherein said introducing means comprises circulation means for withdrawing air from and reintroducing it into said enclosure, and conditioning means for conditioning the air so withdrawn while it is without said enclosure prior to reintroduction thereinto.

18. The apparatus as set forth in claim 17 wherein said conditioning means comprises means for heating and increasing the humidity of said withdrawn air.

19. The apparatus as set forth in claim 18 wherein said conditioning means comprises a live steam injection device.

20. The apparatus as set forth in claim 19 wherein said outlets are spaced along the length of said enclosure.

21. The apparatus as set forth in claim 20 wherein said outlets are positioned so as to direct the conditioned air into said enclosure as varying angles with respect to the path of bird travel therethrough.

22. The apparatus as set forth in claim 19 wherein said conditioning means comprises means for heating and increasing the humidity of said withdrawn air.

23. The apparatus as set forth in claim 17 wherein said circulation means includes an intake for withdrawing air from said enclosure and a plurality of outlets communicating with the interior of said enclosure.

24. The apparatus as set forth in claim 17 wherein said circulation means includes an elongated air duct extending generally parallel to said elongated enclosure.

25. The apparatus as set forth in claim 1 wherein said spraying means is near the bird entry extremity of said enclosure, said picking means being spaced therefrom toward said bird exit extremity.

26. The apparatus as set forth in claim 25 wherein the temperature of said liquid scalding medium equals approximately the temperature maintained within said enclosure by said controlling means.

27. The apparatus as set forth in claim 26 wherein the temperature of said liquid scalding medium is in the range of 126 degrees Fahrenheit to 135 degrees Fahrenheit.

28. The apparatus as set forth in claim 26 wherein the temperature of said liquid scalding medium is in the range of 135 degrees Fahrenheit to 150 degrees Fahrenheit.

29. The apparatus as set forth in claim 25 wherein the temperature of said liquid scalding medium is in the range of 120 degrees Fahrenheit to 160 degrees Fahrenheit.

30. The apparatus as set forth in claim 25 wherein said introducing means comprises circulation means for withdrawing air from and reintroducing it into said enclosure, and conditioning means for heating the air so withdrawn while it is without said enclosure prior to reintroduction thereinto.

31. The apparatus as set forth in claim 1 wherein said enclosure includes a series of door-like covers swingably mounted along the sides thereof, said picking means and spraying means being mounted within said covers whereby they can be swung to an open accessible position for cleaning and service.

32. Apparatus for scalding birds comprising:
a generally closed elongated enclosure having bird entry and exit extremities;
spraying means adjacent said bird entry extremity for spraying birds conveyed therethrough;
means for controlling the environmental air within said enclosure within a predetermined range of temperature and humidity conditions, said means including circulation means for withdrawing air from and reintroducing it into said enclosure and conditioning means for treating the air so withdrawn by heating and humidifying it without said enclosure prior to reintroduction thereinto.

33. The apparatus as set forth in claim 32 which further comprises means for determining the temperature within said enclosure and activating or deactivating said conditioning means accordingly.

34. The apparatus as set forth in claim 33 which further comprises picking means in said enclosure for picking birds conveyed therethrough.

35. The apparatus as set forth in claim 1 which further comprises:
an elongated second enclosure positioned within and spaced from said first enclosure, said second enclosure having air egress openings therein and having bird entry and exit extremities; and
means for withdrawing air from the space between said first and second enclosures, heating and humidifying said air and reintroducing said air into the interior of said second enclosure, said air circulating in said second enclosure and thereafter escaping into the space between said first and second enclosures.

36. Apparatus for treating birds comprising:
a generally closed elongated enclosure having bird entry and exit extremities;
conveyor means running through said enclosure for conveying birds to be treated therethrough along a predetermined path;
at least two longitudinally spaced picking means within said enclosure adjacent said path for contacting said birds as they are conveyed thereby and wiping the feathers therefrom; and
scalding means in said enclosure between said picking means such that the birds are partially picked by one of said picking means, thereafter scalded and then picked by the other of said picking means as they are conveyed through said enclosure, said scalding means including means for controlling the environmental air between said two picking means within a predetermined range of temperature and humidity conditions.

37. The apparatus as set forth in claim 36 which further includes means for sensing when said environmental air is tending to depart from said conditions and means for introducing properly conditioned air into said enclosure to correct such tendency towards departure.

38. The apparatus as set forth in claim 36 which further comprises spraying means within said enclosure adjacent said path for spraying said birds with a liquid scalding solution as they are conveyed thereby, said spraying means being positioned such that said birds are sprayed prior to being contacted by said one picking means.

39. The apparatus as set forth in claim 38 wherein said scaling means comprises:
an elongated interior enclosure positioned within and spaced from said generally closed enclosure, said interior enclosure having air egress openings therein and having bird entry and exit extremities; and
means for withdrawing air from the space between said closed enclosure and interior enclosures, heating and humidifying said air and reintroducing said air into the interior of said interior enclosure, said air circulating in said interior enclosure and thereafter escaping into the space between said closed enclosure and said interior enclosure.

40. The apparatus as set forth in claim 39 wherein said withdrawing means withdraws said air in the vicinity of said one picking means.

41. The apparatus as set forth in claim 38 which further comprises trough means positioned within and extending generally for the length of said enclosure; and means for circulating fluid through said trough means to carry away the feathers wiped from said birds by said picking means.

42. The apparatus as set forth in claim 38 wherein said spraying means comprises a manifold mounted within said enclosure having a series of nozzles mounted thereon such that the scalding solution issuing therefrom will impinge upon the birds as they are conveyed thereby, and means for moving said manifold in an oscillating manner such that the solution issuing from said nozzles will sweep back and forth over the bodies of said birds.

43. The apparatus as set forth in claim 42 wherein said spraying means includes means for pressurizing said scalding solution to a pressure in excess of 75 psi in said manifold.

44. The apparatus as set forth in claim 36 wherein said scalding means comprises:
an elongated interior enclosure positioned within and spaced from said generally closed enclosure, said interior enclosure having air egress openings therein and having bird entry and exit extremities; and means for withdrawing air from the space between said closed and interior enclosures, heating and humidifying said air and reintroducing said air into the interior of said interior enclosure, said air circulating in said interior enclosure and thereafter escaping into the space between said closed and interior enclosures.

45. The apparatus as set forth in claim 36 wherein said enclosure includes at least one door-like cover swingably mounted along the side thereof, at least one of said picking means being mounted within said cover whereby it can be swung to an open, accessible position for cleaning and service.

46. The apparatus as set forth in claim 36 wherein said enclosure includes a series of door-like sections swingably mounted along the sides thereof, said sections being swingable from a closed to an open position to permit access to the interior of said enclosure for cleaning and servicing.

47. The apparatus as set forth in claim 36 wherein said controlling means comprises circulation means for withdrawing air from and reintroducing it into said enclosure, and conditioning means for conditioning the air so withdrawn while it is without said enclosure prior to reintroduction thereinto.

48. The apparatus as set forth in claim 47 wherein said conditioning means comprises means for heating and increasing the humidity of said withdrawn air.

49. Apparatus for treating birds comprising:
  a generally closed, elongated first enclosure having bird entry and exit extremities;
  an elongated second enclosure positioned within and spaced from said first enclosure, said second enclosure having air egress openings therein and having bird entry and exit extremities;
  conveyor means running through said enclosures for conveying birds to be treated through said second enclosure along a predetermined path;
  means for withdrawing air from the space between said first and second enclosures, heating and humidifying said air and reintroducing said air into the interior of said second enclosure, said air circulating in said second enclosure and thereafter escaping into the space between said first and second enclosures.

50. The apparatus as set forth in claim 49 which further comprises picking means within said first enclosure on opposite ends of said second enclosure.

* * * * *